J. F. BROWN.
Churn.
No. 66,295.
Patented July 2, 1867.
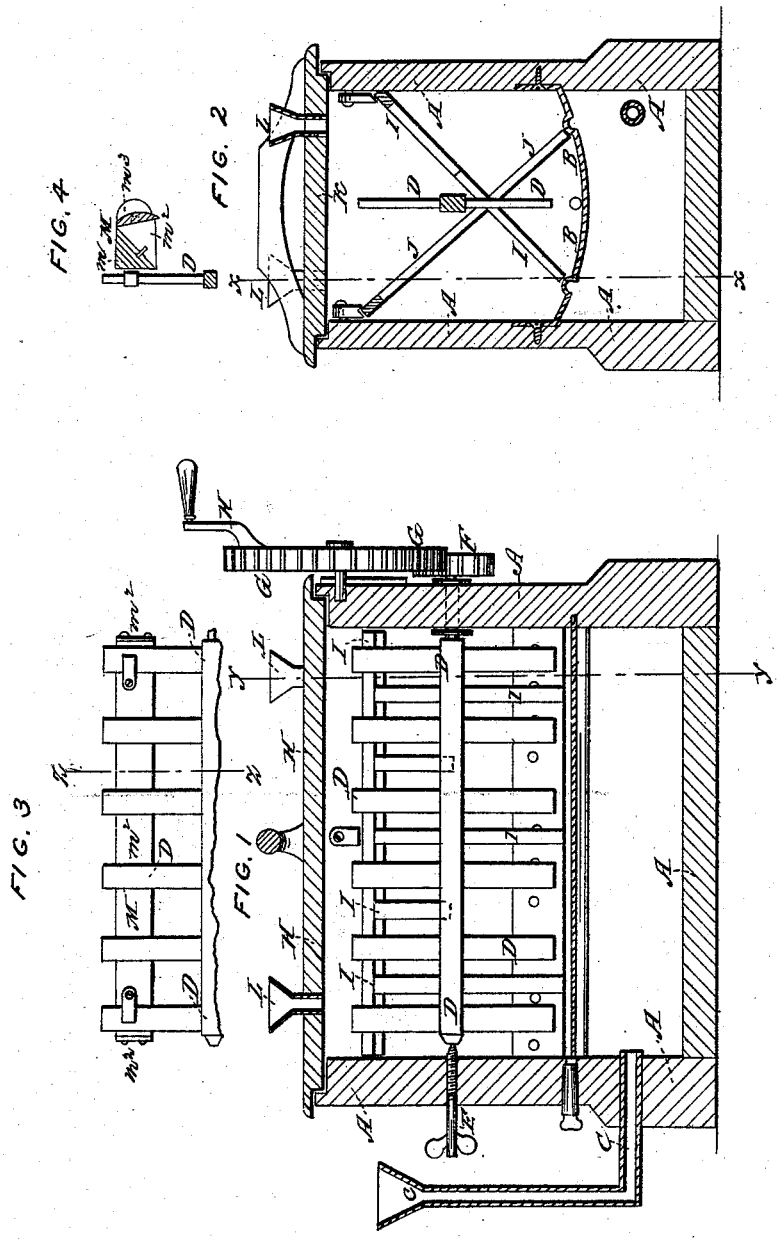

United States Patent Office.

JOHN F. BROWN, OF NEW LONDON, CONNECTICUT.

Letters Patent No. 66,295, dated July 2, 1867.

---

IMPROVEMENT IN CHURNS.

---

*The Schedule referred to in these Letters Patent and making part of the same.*

---

TO ALL WHOM IT MAY CONCERN:

Be it known that I, JOHN F. BROWN, of New London, in the county of New London, and State of Connecticut, have invented a new and useful Improvement in Churn; and I do hereby declare that the following is a full, clear, and exact description thereof, which will enable others skilled in the art to make and use the same, reference being had to the accompanying drawings, forming part of this specification, in which—

Figure 1 is a longitudinal section of my improved churn, taken through the line $x\ x$, fig. 2.

Figure 2 is a cross-section of the same, taken through the line $y\ y$, fig. 2.

Figure 3 is a detail view of one-half of the dasher, showing the butter-worker in place.

Figure 4 is a cross-section of the same, taken through the line $z\ z$, fig. 3.

Similar letters of reference indicate like parts.

My invention has for its object to furnish an improved churn, simple in construction, easily operated, readily cleaned, and which will do its work thoroughly and quickly; and it consists in the removable cutters, in combination with the radial armed dasher, in forming a water-chamber in the bottom of the churn by means of a curved metallic bottom plate; and in the butter-worker and gatherer in combination with the radial arms of the dasher; the whole being constructed and arranged as hereinafter more fully described.

A is the box of the churn, which is made rectangular in form, as shown in figs. 1 and 2. B is a metallic division-plate, or false bottom, which divides the interior of the churn into two compartments—an upper compartment in which the churning is done, and a lower and smaller one in which hot or cold water is placed to warm or cool the contents of the churn, as may be desired. The plate B may have two or more ribs or upwardly projecting corrugations formed upon it, as shown in fig. 2. The edges of the plate B should be so secured to the sides and ends of the churn that the joints may be perfectly water-tight. This I prefer to accomplish by securing the edges of the plate B in grooves formed in the said sides and ends of the said box. C is an elbow pipe having a funnel mouth, and leading into the lower or water-chamber, as shown in fig. 1, for convenience in supplying the chamber with water, which may be drawn off through a stop-cock when desired. D is the dasher, consisting of a shaft with two rows of radial arms projecting from it. In one end of the dasher-shaft is formed a round socket working upon a screw-pivot, E, passing in through the end of the box A in such a way as to be water-tight. This enables the said pivot to be screwed out so that the dasher can be readily removed from the churn when required. The other end of the dasher-shaft has a square socket formed in it, fitting upon the squared end of the journal of the gear-wheel F, so that the dasher may be revolved by the revolution of the said gear-wheel F. G is a gear-wheel pivoted to the end of the churn, the teeth of which mesh into the teeth of the gear-wheel F, and to the side of which is attached a crank, H, by means of which the dasher is operated. I and J are racks or cutters, the longitudinal bars of which rest against the sides of the box, where they are secured in place by buttons, as shown in figs. 1 and 2. The ends of the cross-bars or arms of the cutters rest upon the metallic plate or bottom B. The arms of the cutters cross each other beneath the dasher-shaft in the spaces between its radial arms, as shown in fig. 2. To enable this to be done every other arm of each rack is cut off just above the point of crossing, so that the arms of the one rack will not interfere with the arms of the other. K is the lid or cover which fits closely upon the top of the box A, as shown in figs. 1 and 2. The lid K has air-holes formed through it, in which are placed short pipes, L, having funnel-shaped mouths to guard against the milk spattering out while being churned. M is the butter-gatherer and worker, which consists of a triangular bar, $m^1$, having ears $m^2$ projecting from its ends, to which are pivoted the ends of the bar $m^3$, which is flat on one side and convex upon the other, and the movement of which may be restricted by stop-pins attached to the inclined side of the bar $m^1$. The bar $m^1$ has catches attached to its rear side fitting upon the arms of the dasher D, by which it is held in place upon said dasher-arms while being operated. By turning the dasher in one direction the pivoted bar $m^3$ will take such a position with reference to the bar $m^1$ as to gather the butter completely in a very short time. Then by drawing off the buttermilk, pouring in the necessary amount of water, and turning the dasher in the other direction, the butter will be quickly and conveniently worked. When it is desired to operate the gatherer the cutters I J are removed from the churn, and the gatherer M attached to the radial arm D of the dasher parallel therewith, and secured by means of buttons, or in any convenient manner.

What I claim as new, and desire to secure by Letters Patent, is—

1. The combination of the curved metallic bottom B with the sides and ends of the box A, for the purpose of forming a water-chamber in the lower part of said box, substantially as herein shown and described.

2. The butter-gatherer and worker M, constructed, arranged, and operated substantially as herein shown and described and for the purpose set forth.

JOHN F. BROWN.

Witnesses:
DAVID A. WRIGHT,
J. B. SANDERS.